(12) United States Patent
Matsuo et al.

(10) Patent No.: US 12,391,235 B2
(45) Date of Patent: Aug. 19, 2025

(54) VEHICLE

(71) Applicant: TOYOTA JIDOSHA KABUSHIKI KAISHA, Toyota (JP)

(72) Inventors: Noriaki Matsuo, Okazaki (JP); Tetsuya Ichiyanagi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 18/142,853

(22) Filed: May 3, 2023

(65) Prior Publication Data

US 2024/0017718 A1 Jan. 18, 2024

(30) Foreign Application Priority Data

Jul. 13, 2022 (JP) .................. 2022-112469

(51) Int. Cl.
*B60W 30/04* (2006.01)
*B60W 10/184* (2012.01)
*B60W 10/20* (2006.01)
*B60W 30/045* (2012.01)

(52) U.S. Cl.
CPC ........ *B60W 30/045* (2013.01); *B60W 10/184* (2013.01); *B60W 10/20* (2013.01); *B60W 2510/20* (2013.01); *B60W 2520/14* (2013.01); *B60W 2710/18* (2013.01)

(58) Field of Classification Search
CPC .. B60W 30/045; B60W 10/184; B60W 10/20; B60W 2510/20; B60W 2520/14; B60W 2710/18; B60T 8/1766; B60T 8/1755; B60T 8/17551
See application file for complete search history.

(56) References Cited

U.S. PATENT DOCUMENTS

2004/0227399 A1 11/2004 Sasaki
2018/0029593 A1* 2/2018 Kozuka ................. B60W 10/18
2018/0236876 A1* 8/2018 Isono ..................... B60T 13/746
(Continued)

FOREIGN PATENT DOCUMENTS

JP H05-270382 A 10/1993
JP H07-165041 A 6/1995
(Continued)

OTHER PUBLICATIONS

English translation of JP 2011046289.*

*Primary Examiner* — Joseph J Dallo
(74) *Attorney, Agent, or Firm* — Dinsmore & Shohl LLP (57) ABSTRACT

A vehicle disclosed in the present specification includes a front braking unit, a rear braking unit, a steering unit configured to change a turning angle of at least one of the front wheels and the rear wheels, and a braking controller configured to control operations of the front braking unit and the rear braking unit to brake the vehicle. The braking controller is configured to change a ratio between a front braking force and a rear braking force according to a turning angle when the vehicle is braked. In the vehicle that is making a turn, the wheels are likely to sideslip when the vehicle is braked, and the tendency is changed according to a degree of a turn. Therefore, the sideslip of the wheels is effectively suppressed by changing the ratio between the front braking force and the rear braking force according to the turning angle.

10 Claims, 4 Drawing Sheets

(56) References Cited

U.S. PATENT DOCUMENTS

| | | | |
|---|---|---|---|
| 2021/0016825 A1* | 1/2021 | Miura | B62D 6/003 |
| 2021/0394728 A1* | 12/2021 | Yoo | B60T 8/4081 |
| 2022/0016949 A1* | 1/2022 | Graus | B60G 17/08 |
| 2022/0315022 A1* | 10/2022 | Yoshikawa | G07C 5/02 |
| 2022/0411014 A1* | 12/2022 | Meadows | B62M 3/086 |

FOREIGN PATENT DOCUMENTS

| | | | | |
|---|---|---|---|---|
| JP | H10-024819 A | | 1/1998 | |
| JP | 2004-338506 A | | 12/2004 | |
| JP | 2005-028934 A | | 2/2005 | |
| JP | 2011046289 A | * | 3/2011 | |
| JP | 2017-109664 A | | 6/2017 | |
| JP | 2019-051810 A | | 4/2019 | |
| JP | 2020-163966 A | | 10/2020 | |
| WO | WO-2011052078 A1 | * | 5/2011 | B60T 8/1755 |
| WO | WO-2019188951 A1 | * | 10/2019 | B62D 5/001 |
| WO | WO-2021145335 A1 | * | 7/2021 | B60K 23/04 |

\* cited by examiner

VEHICLE

CROSS-REFERENCE TO RELATED APPLICATION

This application claims priority to Japanese Patent Application No. 2022-112469 filed on Jul. 13, 2022, incorporated herein by reference in its entirety.

BACKGROUND

1. Technical Field

The technique disclosed in the present specification relates to a vehicle.

2. Description of Related Art

Japanese Unexamined Patent Application Publication No. 2017-109664 (JP 2017-109664 A) discloses a vehicle in which a braking force applied to rear wheels is increased than a braking force applied to front wheels in a nosedive state in which a front wheel side is lower than a rear wheel side. As a result, the vehicle suppresses pitching that causes the nosedive.

SUMMARY

A vehicle that is traveling straight ahead and a vehicle that is making a turn have different behavior when the vehicle is braked. In particular, in the vehicle that is making a turn, the wheels are likely to sideslip, and a vehicle posture is likely to be unstable. In the braking that uniformly suppresses the nosedive of the vehicle regardless of whether the vehicle is traveling straight ahead or making a turn, there is a concern that the vehicle posture is unstable when the vehicle that is making a turn is braked. The present specification discloses the technique capable of stabilizing the vehicle posture when the vehicle that is making a turn is braked.

A first aspect of the present specification relates to a vehicle including a front braking unit, a rear braking unit, a steering unit, and a braking controller. The front braking unit is configured to apply a front braking force to front wheels. The rear braking unit is configured to apply a rear braking force to rear wheels. The steering unit is configured to change a turning angle of at least one of the front wheels and the rear wheels. The braking controller is configured to control operations of the front braking unit and the rear braking unit to brake the vehicle. The braking controller is configured to change a ratio between the front braking force and the rear braking force according to the turning angle when the vehicle is braked.

As described above, in the vehicle that is making a turn, the wheels are likely to sideslip, and the tendency is changed according to a degree of a turn, that is, the turning angle of the front wheels or the rear wheels. Therefore, the sideslip of the wheels is effectively suppressed by changing the ratio between the front braking force and the rear braking force according to the turning angle. As a result, the vehicle posture can be stabilized when the vehicle that is making a turn is braked.

Details and further improvements of the technique disclosed in the present specification are described in the following "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the present technique, a braking controller may increase a ratio of a front braking force to a rear braking force as a turning angle is increased. In general, when a vehicle that is making a turn is braked, as the turning angle is increased, the wheels are more likely to sideslip and a vehicle posture is more likely to be unstable. In particular, when the rear wheels sideslip, the vehicle posture is greatly disturbed. In order to avoid the disturbance, the rear braking force may be relatively decreased as the turning angle is increased, and the front braking force may be relatively increased accordingly. As a result, the vehicle posture can be more stabilized when the vehicle that is making a turn is braked.

In the embodiment described above, the ratio of the front braking force to the rear braking force may be changed stepwise according to the turning angle, or may be changed continuously according to the turning angle. According to the latter aspect, the ratio of the front braking force to the rear braking force can be appropriately adjusted according to the turning angle that is changed every second while the vehicle is making a turn.

In one embodiment of the present technique, the vehicle may further include a yaw rate sensor that detects a yaw rate of the vehicle. In this case, the braking controller may decide an assumption value of the yaw rate according to the turning angle and execute feedback control of the ratio between the front braking force and the rear braking force according to a deviation of a detection value of the yaw rate sensor from the assumption value. In general, the yaw rate of the vehicle is decided by the turning angle. However, an actual yaw rate can be changed due to other factors, such as a vehicle speed or a road surface state. That is, the deviation can occur between the assumption value of the yaw rate decided according to the turning angle and the detection value of the yaw rate sensor indicating the actual yaw rate. Therefore, by executing the feedback control of the ratio between the front braking force and the rear braking force according to the deviation, the sideslip of the wheels can be effectively suppressed, and the vehicle posture can be more stabilized.

In one embodiment of the present technique, the braking controller may increase the ratio of the front braking force to the rear braking force regardless of the turning angle in a case where a target braking force for the vehicle shows an increase exceeding a predetermined change rate or change width. A case where the target braking force exceeds the predetermined change rate or change width indicates that the vehicle is suddenly braked. When the vehicle is suddenly braked, the vehicle posture is likely to be unstable. In such a state, the vehicle posture when the vehicle is braked can be stabilized by increasing the ratio of the front braking force to the rear braking force regardless of the turning angle.

EMBODIMENT

Figure 1:
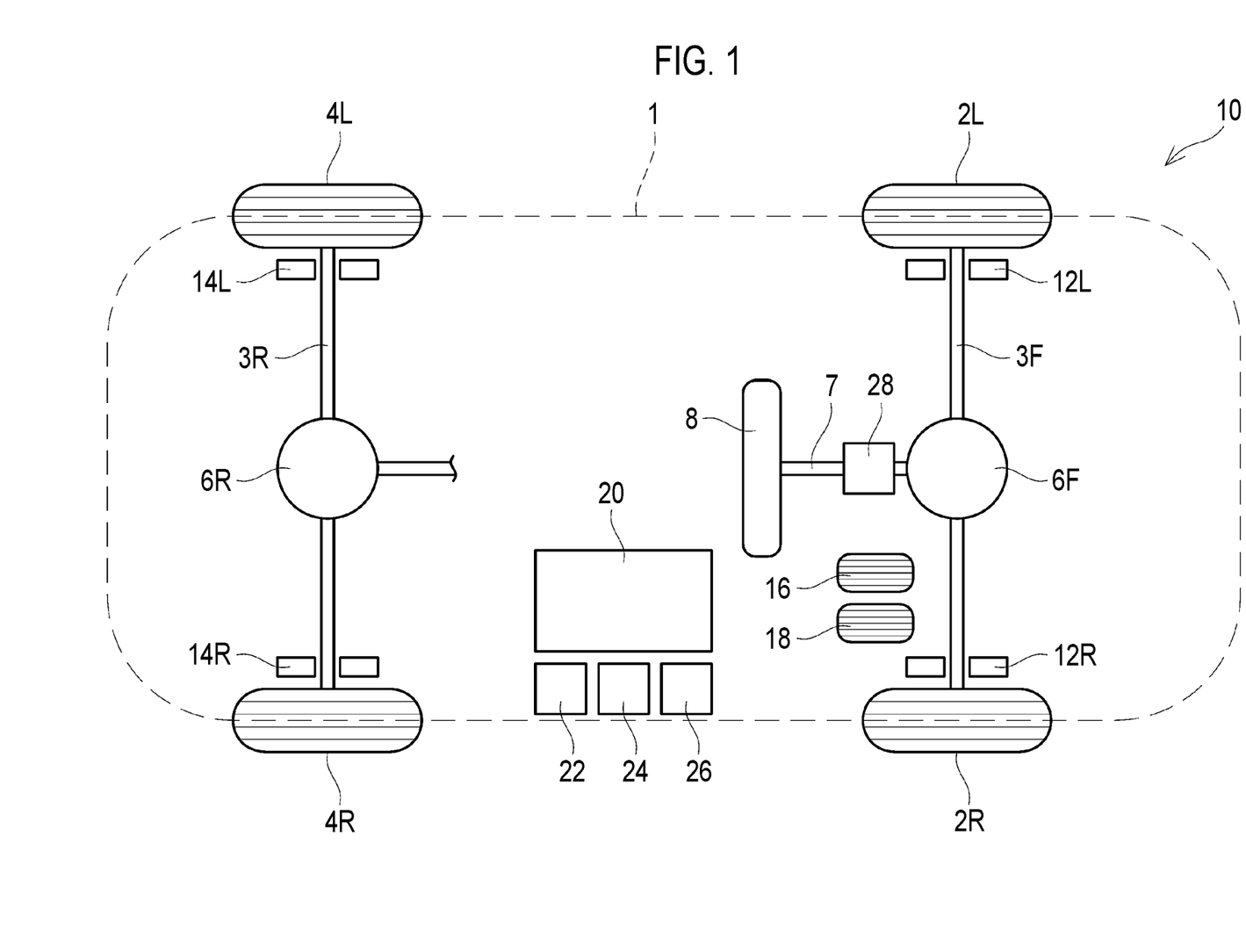
FIG. 1 shows a block diagram of a vehicle 10 of an embodiment.

FIG. 1 is a block diagram schematically showing the vehicle 10 of an embodiment. The vehicle 10 includes a vehicle body 1, a pair of front wheels 2R, 2L, a pair of rear wheels 4R, 4L, an accelerator pedal 18, a brake pedal 16, and a braking controller 20. The front wheels 2R, 2L are connected to each other by a front shaft 3F. A steering shaft 7 is connected to the front shaft 3F via a front differential gear 6F. A steering wheel 8 is provided at an end portion of the steering shaft 7. When a user rotates the steering wheel 8, the turning angle of each of the front wheels 2R, 2L is changed by the steering shaft 7 and the front differential gear 6F according to a rotation angle (that is, a steering angle) of the steering wheel 8. As a result, the vehicle 10 makes a turn. Similarly, the rear wheels 4R, 4L are connected to each other by a rear shaft 3R. A rear differential gear 6R is provided on the rear shaft 3R. The vehicle 10 travels by driving each of the wheels 2R, 2L, 4R, 4L.

A pair of front brakes 12R, 12L is provided at an end portion of the front shaft 3F. Similarly, a pair of rear brakes 14R, 14L is provided at an end portion of the rear shaft 3R. Each of the brakes 12R, 12L, 14R, 14L is a friction brake. The front brakes 12R, 12L apply a frictional braking force to the front shaft 3F. As a result, the braking force is applied to the front wheels 2R, 2L. Similarly, the rear brakes 14R, 14L apply a frictional braking force to the rear shaft 3R. As a result, the braking force is applied to the rear wheels 4R, 4L. As a result, the vehicle 10 is braked.

The vehicle 10 further includes a front-rear acceleration sensor 22, a right-left acceleration sensor 24, a yaw rate sensor 26, and a steering angle sensor 28. The front-rear acceleration sensor 22 detects acceleration of the vehicle 10 in a vehicle length direction (that is, a right-left direction of the paper surface of FIG. 1). The right-left acceleration sensor 24 detects acceleration of the vehicle 10 in a vehicle width direction (that is, an up-down direction of the paper surface of FIG. 1). The yaw rate sensor 26 is a gyroscope device that measures a change speed of a yaw angle (that is, the yaw rate) that is a change angle in a traveling direction of the vehicle. The steering angle sensor 28 detects the rotation angle of the steering wheel 8.

The braking controller 20 is a computer including a CPU. Although not shown, the braking controller 20 is electrically connected to each of the sensors 22, 24, 26, 28, and receives various information from each of the sensors 22, 24, 26, 28. As a result, the braking controller 20 can acquire various information related to the vehicle posture of the vehicle 10, for example. Further, the braking controller 20 is electrically connected to the brake pedal 16, the accelerator pedal 18, and each of the brakes 12R, 12L, 14R, 14L. The braking controller 20 acquires respective depression amounts from the brake pedal 16 and the accelerator pedal 18. The braking controller 20 controls operations of various devices of the vehicle 10, particularly each of the brakes 12R, 12L, 14R, 14L, based on various information received from each of the pedals 16, 18 and each of the sensors 22, 24, 26, 28. Note that, hereinafter, the braking controller 20 is simply described as a "controller 20".

Figure 2:
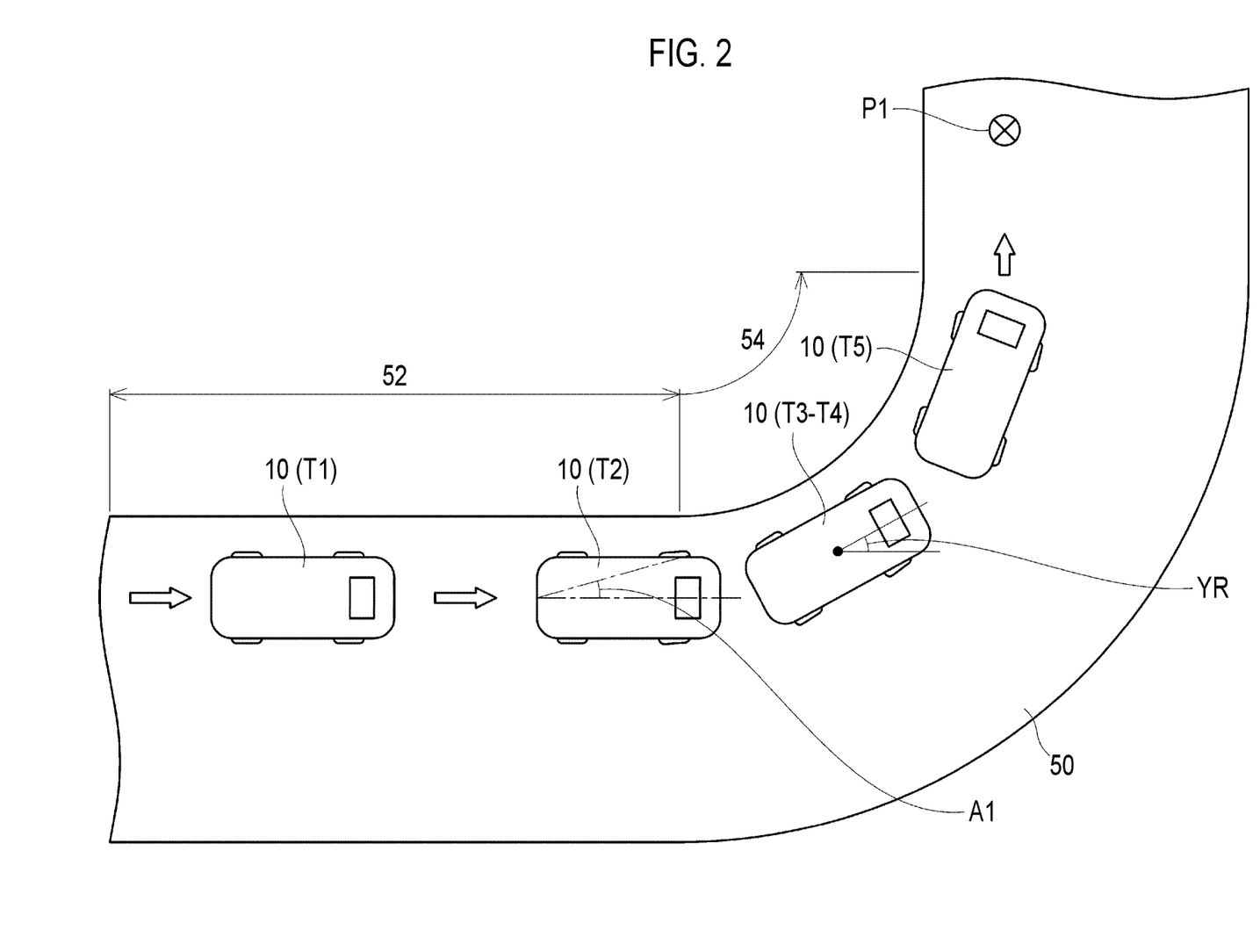
FIG. 2 shows movement of the vehicle 10 at each of timings T1 to T5 when the vehicle that is making a turn is braked.
Figure 3:
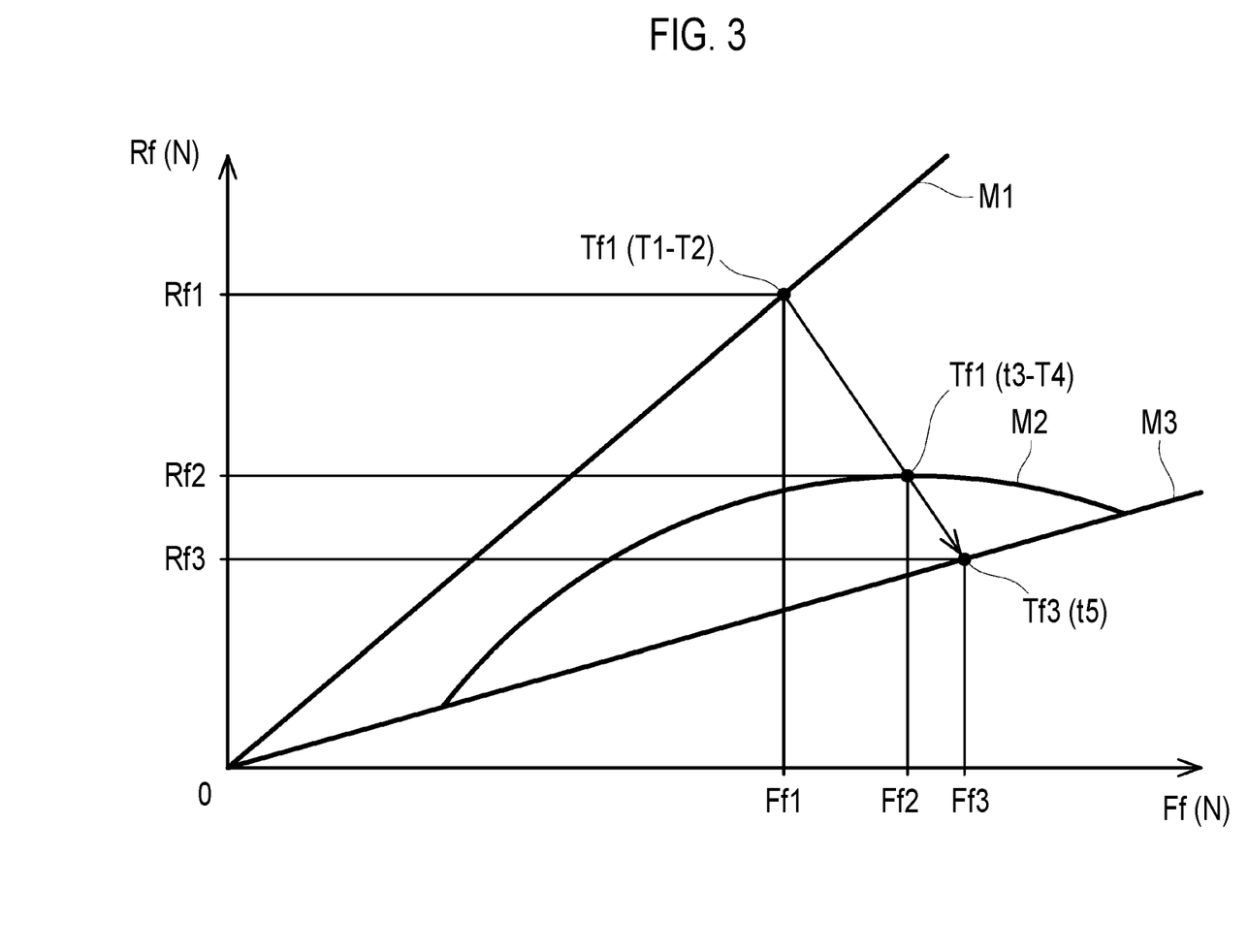
FIG. 3 shows a graph of a target braking force Tf, a front braking force Ff, and a rear braking force Rf.
Figure 4:
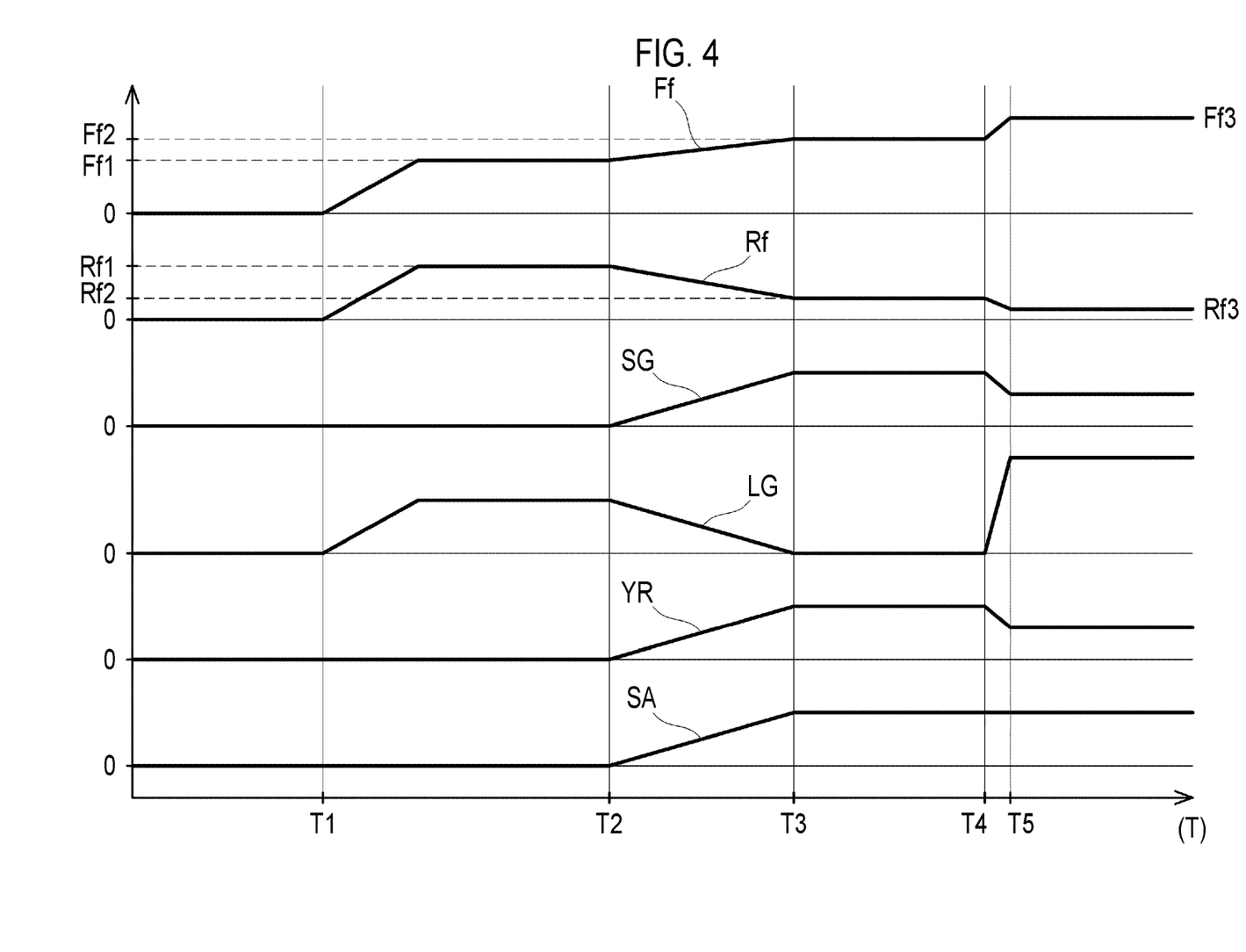
FIG. 4 shows a time chart of each value at each of timings T1 to T5.

With reference to FIGS. 2 to 4, the braking force applied to each of the wheels 2R, 2L, 4R, 4L until the vehicle 10 is braked in a case where the user depresses the brake pedal 16 of the vehicle 10 that is making a turn on a road 50 that is curved will be described.

FIG. 2 shows the movement of the vehicle 10 at each of timings T1 to T5. The user depresses the brake pedal 16 while the vehicle 10 is traveling on a straight part 52 of the road 50 (for example, timing T1). Then, at timing T2, the user rotates the steering wheel 8 counterclockwise. As a result, a turning angle A1 of the front wheels 2R, 2L is gradually increased. As a result, the vehicle 10 makes a turn to the left (that is, upwards on the paper surface of FIG. 2) along a curved part 54 of the road 50 at timings T3 to T4. In this case, a yaw rate YR of the vehicle 10 is increased as the vehicle 10 makes a turn. Note that, in a modification example, according to the rotation of the steering wheel 8, the turning angle A1 of the rear wheels 4R, 4L may be changed, or the turning angle A1 of each of the wheels 2R, 2L, 4R, 4L may be changed.

In addition, the user remains depressing the brake pedal 16 while the vehicle 10 is making a turn along the curved part 54. Therefore, the vehicle 10 remains braking while the vehicle 10 is making a turn along the curved part 54. Thereafter, at timing T5, the user further abruptly depresses the brake pedal 16. As a result, the vehicle 10 is suddenly braked and is stopped at a stop point P 1.

FIG. 3 shows a graph of a target braking force Tf, a front braking force Ff, and a rear braking force Rf. When the user depresses the brake pedal 16 at timing T1, the controller 20 acquires information, such as the depression amount, from the brake pedal 16. The controller 20 calculates a target braking force Tf1 for the vehicle 10 based on the acquired information, such as the depression amount. At timing T1, the user does not rotate the steering wheel 8. Therefore, at timing T1, the turning angle A1 of the front wheels 2R, 2L is zero. In this case, the controller 20 substantially evenly distributes the calculated target braking force Tf1 to the front brakes 12R, 12L and the rear brakes 14R, 14L as indicated by a straight line M1. That is, at timing T1, the controller 20 distributes the target braking force Tf1 such that a front braking force Ff1 and a rear braking force Rf1 are substantially equal to each other. As a result, the front braking force Ff1 is applied to the front wheels 2R, 2L, and the rear braking force Rf1 is applied to the rear wheels 4R, 4L. As a result, the vehicle 10 starts braking with the target braking force Tf1. Note that, in the modification example, at timing T1, the controller 20 may distribute the target braking force Tf1 to the front brakes 12R, 12L and the rear brakes 14R, 14L such that the rear braking force Rf1 is larger than the front braking force Ff1. As a result, the leaning forward of the vehicle 10 can be suppressed when the vehicle is braked in a state in which the vehicle 10 travels straight ahead.

At timing T2, the controller 20 acquires the rotation angle of the steering wheel 8 from the steering angle sensor 28. The controller 20 calculates the turning angle A1 of the front wheels 2R, 2L from the acquired rotation angle. The controller 20 increases the front braking force Ff1 to a front braking force Ff2 and decreases the rear braking force Rf1 to a rear braking force Rf2, according to the calculated turning angle A1. That is, the controller 20 changes the ratio between the front braking force Ff2 and the rear braking force Rf2 according to the turning angle A1. Therefore, as shown in FIG. 3, the ratio between the front braking force Ff2 and the rear braking force Rf2 is changed along a curve M2.

When the brake pedal 16 is abruptly depressed at timing T4, the controller 20 calculates a target braking force Tf3 larger than the target braking force Tf1 from the depression amount of the brake pedal 16. In a case where the target braking force Tf3 shows an increase exceeding a predetermined change width with respect to the target braking force Tf1, the vehicle 10 is suddenly braked. When the vehicle 10 is suddenly braked while the vehicle 10 is making a turn at the turning angle A1, the vehicle posture is more likely to be unstable. Therefore, in a case where the target braking force Tf1 shows an increase exceeding a predetermined change width, the controller 20 further increases the front braking force Ff2 on the curve M2 to a front braking force Ff3 on a straight line M3, and further decreases the rear braking force Rf2 on the curve M2 to a rear braking force Rf3 on the straight line M3. That is, in this case, the controller 20 further increases a ratio of the front braking force Ff to the rear braking force Rf regardless of the turning angle A1. As a result, the vehicle posture can be stabilized in a case where the target braking force Tf3 shows an increase exceeding the predetermined change width with respect to the target braking force Tf1. Note that, in the modification example, in a case where the target braking force Tf3 shows an increase exceeding a predetermined change rate with respect to the target braking force Tf1 instead of the predetermined change width, the controller 20 may further increase the front braking force Ff2 to the front braking force Ff3 and further decrease the rear braking force Rf2 to the rear braking force Rf3.

In the vehicle 10 that is making a turn on the road 50, each of the wheels 2R, 2L, 4R, 4L is likely to sideslip when the vehicle is braked, and the vehicle posture is likely to be unstable. In addition, in the vehicle 10 that is making a turn on the road 50, each of the wheels 2R, 2L, 4R, 4L is more likely to sideslip as the turning angle A1 when the vehicle is braked is increased. For example, when a ratio of the rear braking force Rf2 to the front braking force Ff2 is increased, the rear wheels 4R, 4L of the vehicle 10 are particularly likely to sideslip. In the vehicle 10 of the present embodiment, the ratio between the front braking force Ff and the rear braking force Rf is changed according to the turning angle A1. Further, in the vehicle 10, the ratio of the front braking force Ff to the rear braking force Rf is increased as the turning angle A1 is increased. As a result, without changing the target braking force Tf1, the rear braking force Rf can be relatively decreased as the turning angle A1 is increased, and the sideslip of the rear wheels 4R, 4L can be reduced. As a result, the vehicle posture can be stabilized when the vehicle 10 that is making a turn is braked.

FIG. 4 shows a time chart of the front braking force Ff, the rear braking force Rf, front-rear acceleration LG that is a detection value of the front-rear acceleration sensor 22, right-left acceleration SG that is a detection value of the right-left acceleration sensor 24, the yaw rate YR that is a detection value of the yaw rate sensor 26, and a steering angle SA that is a detection value of the steering angle sensor 28.

When the brake pedal 16 is depressed at timing T1, the front braking force Ff is increased in a straight line to the front braking force Ff1. While the brake pedal 16 is being depressed, the front braking force Ff is maintained at the front braking force Ff1. Similarly, the rear braking force Rf is increased in a straight line to the rear braking force Rf1 and is maintained at the rear braking force Rf1. As described with reference to FIG. 3, at timings T1 to T2, the controller 20 operates each of the brakes 12R, 12L, 14R, 14L such that the braking forces Ff, Rf are equal to each other. Therefore, each of the braking forces Ff, Rf is increased in a straight line having the same slope. As a result, since the braking force is applied to the vehicle 10, the front-rear acceleration LG is increased as each of the braking forces Ff, Rf is increased.

As described with reference to FIG. 3, the steering angle SA is gradually increased as the user rotates the steering wheel 8 counterclockwise at timing T2. As a result, the vehicle 10 makes a turn along the curved part 54 of the road 50 (see FIG. 2). In the present embodiment, the steering angle SA is maintained at a regular angle over timings T3 to T5.

When the steering angle SA is increased, since the traveling direction of the vehicle 10 is changed, the yaw rate YR and the right-left acceleration SG are increased, and the front-rear acceleration LG is decreased. In this case, the controller 20 continuously increases the front braking force Ff from the front braking force Ff1 to the front braking force Ff2 and continuously decreases the rear braking force Rf from the rear braking force Rf1 to the rear braking force Rf2, according to the turning angle A1 calculated from the steering angle SA. Therefore, between timings T2 and T3, the front braking force Ff and the rear braking force Rf are continuously changed according to the change in the steering angle SA. As a result, the ratio of the front braking force Ff to the rear braking force Rf can be appropriately adjusted according to the turning angle A1 that is changed every second while the vehicle is making a turn. The front braking force Ff is maintained at the front braking force Ff2 over timings T3 to T4, and the rear braking force Rf is maintained at the rear braking force Rf2 over timings T3 to T4.

When the brake pedal 16 is abruptly depressed at timing T4, the front-rear acceleration LG is abruptly increased. Along with the increase, the right-left acceleration SG is decreased, and the yaw rate YR is also decreased. In this case, the steering angle SA is not changed. That is, the controller 20 further increases the front braking force Ff from the front braking force Ff2 to the front braking force Ff3 and further decreases the rear braking force Rf from the rear braking force Rf2 to the rear braking force Rf3, regardless of the turning angle A1. Therefore, as shown in FIG. 4, the change rate of the front braking force Ff between timings T4 and T5 is larger than the change rate of the rear braking force Rf between timings T4 and T5. As a result, the ratio of the front braking force Ff to the rear braking force Rf is further increased.

In this way, a correlation is recognized between the vehicle posture of the vehicle 10 and the detection value of each of the sensors 22, 24, 26, 28. In general, the yaw rate YR that is the detection value of the yaw rate sensor 26 is a value decided by the turning angle A1. That is, the yaw rate YR is a value that can be assumed according to the turning angle A1. However, for example, the actual yaw rate YR can be changed due to other factors, such as each of the wheels 2R, 2L, 4R, 4L, and road surface state of the road 50. That is, the deviation can occur between the assumption value of the yaw rate YR decided according to the turning angle A1 and the detection value of the yaw rate sensor 26 indicating the actual yaw rate YR.

Therefore, the controller 20 may decide the assumption value of the yaw rate YR according to the turning angle A1. In this case, the controller 20 may execute the feedback control of the ratio between the front braking force Ff and the rear braking force Rf according to the deviation of the actual yaw rate YR from the assumption value.

Specifically, the controller 20 compares the actual yaw rate YR of the vehicle 10 acquired from the yaw rate sensor 26 with the assumption value decided according to the turning angle A1. In a case where the yaw rate YR is larger than the assumption value, an estimation is made that the rear wheels 4R, 4L sideslip. Therefore, the controller adjusts each of the braking forces Rf, Fr such that the ratio of the front braking force Ff to the rear braking force Rf is increased. As a result, since the sideslip of the rear wheels 4R, 4L can be reduced, the yaw rate YR of the vehicle 10 is decreased. As a result, the actual yaw rate YR can be made closer to the assumption value decided according to the turning angle A1, and the vehicle posture can be more stabilized.

On the other hand, in a case where the yaw rate YR is smaller than the assumption value, the controller 20 estimates that the front wheels 2R, 2L sideslip. Therefore, the controller 20 adjusts each of the braking forces Rf, Fr such that the ratio of the front braking force Ff to the rear braking force Rf is decreased. As a result, since the sideslip of the front wheels 2R, 2L can be reduced, the yaw rate YR of the vehicle 10 is increased. As a result, the actual yaw rate YR can be made closer to the assumption value decided according to the turning angle A1, and the vehicle posture can be more stabilized.

Note that, when the controller 20 decides the assumption value according to the turning angle A1, in addition to the yaw rate YR, the front-rear acceleration LG that is the detection value of the front-rear acceleration sensor 22, the right-left acceleration SG that is the detection value of the right-left acceleration sensor 24, and a slip rate may be further added. As a result, the ratio between the front braking force Ff and the rear braking force Rf can be changed based on the vehicle posture of the vehicle 10 more accurately.

Although the specific examples of the technique disclosed in the present specification have been described above in detail, these are merely examples and do not limit the scope of the claims. The technique described in the scope of the claims includes various modifications and changes of the specific examples described above. The modification examples of the embodiment described above are listed below.

Modification Example 1

The vehicle 10 may be a vehicle that can execute so-called autonomous driving. In this case, the vehicle 10 does not have to include the steering wheel 8. In the present modification example, for example, the vehicle 10 may change the ratio between the front braking force Ff and the rear braking force Rf according to the turning angle A1 indicated from the outside or according to the turning angle A1 calculated based on map data.

Modification Example 2

The vehicle 10 does not have to include at least one of the front-rear acceleration sensor 22, the right-left acceleration sensor 24, the yaw rate sensor 26, and the steering angle sensor 28.

Modification Example 3

The controller 20 of the vehicle 10 continuously changes the ratio between the front braking force Ff and the rear braking force Rf according to the turning angle A1. Alternatively, the controller 20 of the present modification example may change the ratio between the front braking force Ff and the rear braking force Rf stepwise. In that case, the controller 20 may intermittently change each of the braking forces Ff, Rf between timings T2 and T3 according to the steering angle SA exceeding a predetermined value.

Modification Example 4

When the brake pedal 16 is abruptly depressed at timing T4 and the target braking force is increased to Tf3, the vehicle 10 may change the ratio between the front braking force Ff and the rear braking force Rf according to the turning angle A1.

The technical elements described in the present specification or the drawings exhibit the technical usefulness alone or in various combinations, and are not limited to the combination described in the claims at the time of filing of application. Also, the technique described in the present specification or the drawings can achieve a plurality of purposes at the same time, and achieving one of the purposes has technical usefulness.

What is claimed is:

1. A vehicle comprising:
   a front braking unit configured to apply a front braking force to front wheels;
   a rear braking unit configured to apply a rear braking force to rear wheels;
   a steering unit configured to change a turning angle of at least one of the front wheels and the rear wheels; and
   a braking controller configured to control operations of the front braking unit and the rear braking unit to brake the vehicle,
   wherein the braking controller is configured to change a ratio between the front braking force and the rear braking force by increasing the front braking force and decreasing the rear braking force according to the turning angle when the vehicle is braked.

2. The vehicle according to claim 1, wherein the braking controller is configured to increase a ratio of the front braking force to the rear braking force as the turning angle is increased.

3. The vehicle according to claim 2, wherein the braking controller is configured to continuously change the ratio of the front braking force to the rear braking force according to the turning angle.

4. The vehicle according to claim 3, further comprising a yaw rate sensor configured to detect a yaw rate of the vehicle,
   wherein the braking controller is configured to decide an assumption value of the yaw rate according to the turning angle and execute feedback control of the ratio between the front braking force and the rear braking force according to a deviation of a detection value of the yaw rate sensor from the assumption value.

5. The vehicle according to claim 1, wherein the braking controller is configured to increase a ratio of the front braking force to the rear braking force regardless of the turning angle in a case where a target braking force for the vehicle shows an increase exceeding a predetermined change rate or change width.

6. The vehicle according to claim 1, wherein the braking controller is configured to change the ratio between the front braking force and the rear braking force stepwise.

7. The vehicle according to claim 4, wherein the braking controller is configured to:
   adjust the front braking force and the rear braking force, when the yaw rate is larger than the assumption value, such that the ratio of the front braking force to the rear braking force is increased; and
   adjust the front braking force and the rear braking force, when the yaw rate is smaller than the assumption value, such that the ratio of the front braking force to the rear braking force is decreased.

8. The vehicle according to claim 4, further comprising an acceleration sensor detecting front-rear acceleration or right-left acceleration, and wherein the braking controller is configured to decide the assumption value according to a detection value of the acceleration sensor.

9. A vehicle comprising:
a front braking unit configured to apply a front braking force to front wheels;
a rear braking unit configured to apply a rear braking force to rear wheels;
a steering unit configured to change a turning angle of at least one of the front wheels; and
a central processing unit configured to:
acquire a depression amount of a brake pedal,
control operation of the front braking unit and the rear braking unit based on the depression amount of the brake pedal to brake the vehicle, and
change a ratio between the front braking force and the rear braking force according to the turning angle only when the vehicle is braked.

10. The vehicle of claim 9, wherein the central processing unit is configured to change the ratio between the front braking force and the rear braking force by increasing the front braking force and decreasing the rear braking force according to the turning angle only when the vehicle is braked.

\* \* \* \* \*